United States Patent [19]
Nelson et al.

[11] 3,872,718
[45] Mar. 25, 1975

[54] MULTIPURPOSE SAMPLER DEVICE FOR LIQUID METAL

[75] Inventors: Paul A. Nelson, Wheaton; Verne M. Kolba, Plainfield; John T. Holmes, Downers Grove, all of Ill.

[73] Assignee: The United States of America as represented by the United States Atomic Energy Commission, Washington, D.C.

[22] Filed: Oct. 30, 1973

[21] Appl. No.: 411,129

[52] U.S. Cl. ............... 73/86, 73/422 R, 73/DIG. 4, 73/9
[51] Int. Cl. ..................... G01n 1/10, G01n 17/00
[58] Field of Search ........ 73/422 R, 422 TC, 421 B, 73/61 LM, 61 R, 86; 23/253 C

[56] References Cited
UNITED STATES PATENTS
| | | | |
|---|---|---|---|
| 2,540,944 | 2/1951 | Handforth | 73/422 R |
| 3,002,820 | 10/1961 | Hall et al. | 23/253 C |
| 3,627,493 | 12/1971 | Manley | 23/253 C |

*Primary Examiner*—S. Clement Swisher
*Attorney, Agent, or Firm*—John A. Horan; Arthur A. Churm; Hugh W. Glenn

[57] ABSTRACT

A device for collecting samples or examining a flow of liquid metal is provided for use with such as a liquid-metal-cooled nuclear reactor. The sampler device includes a casing surrounded by an external heater for establishing an upper isothermal zone and a lower zone for heating the entering liquid metal. One of various inserts is suspended into the isothermal zone where it is surrounded by a shroud tube for directing liquid-metal flow from the heating zone into the top of the insert. Discharge flow from the insert gravitates through a helically wound tube in heat exchange contact with entering liquid-metal flow within the heating zone. The inserts comprise an overflow cup with upper and lower freeze seals, a filter for removing particulate matter, and a fixture for maintaining various sample materials in equilibrium with liquid-metal flow.

10 Claims, 4 Drawing Figures

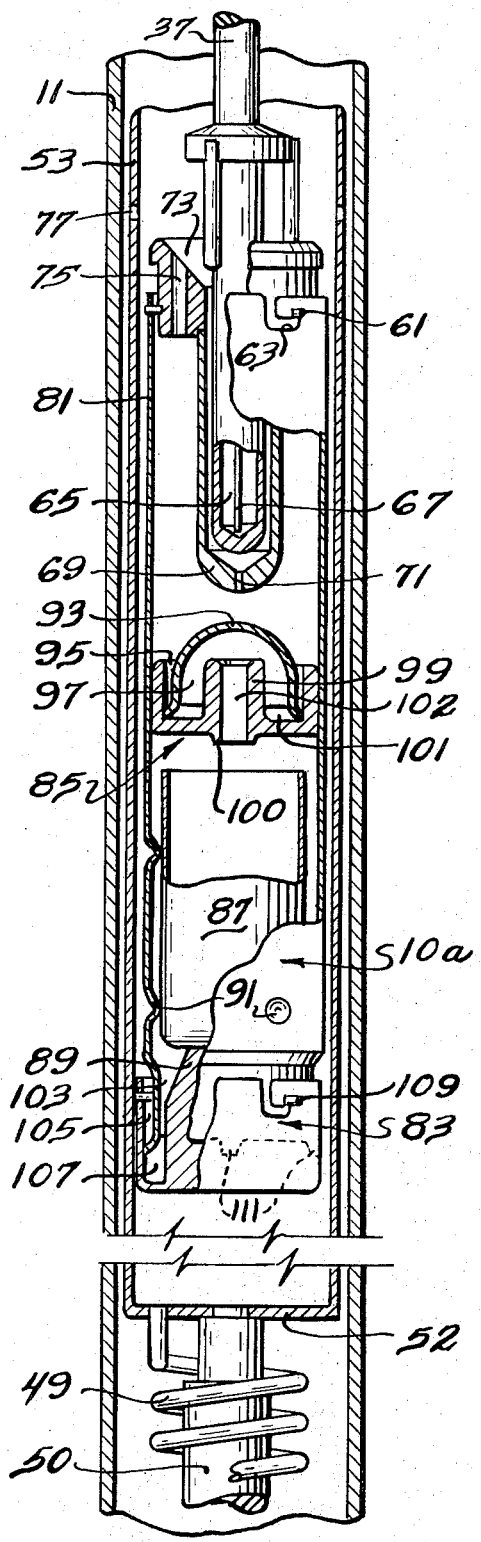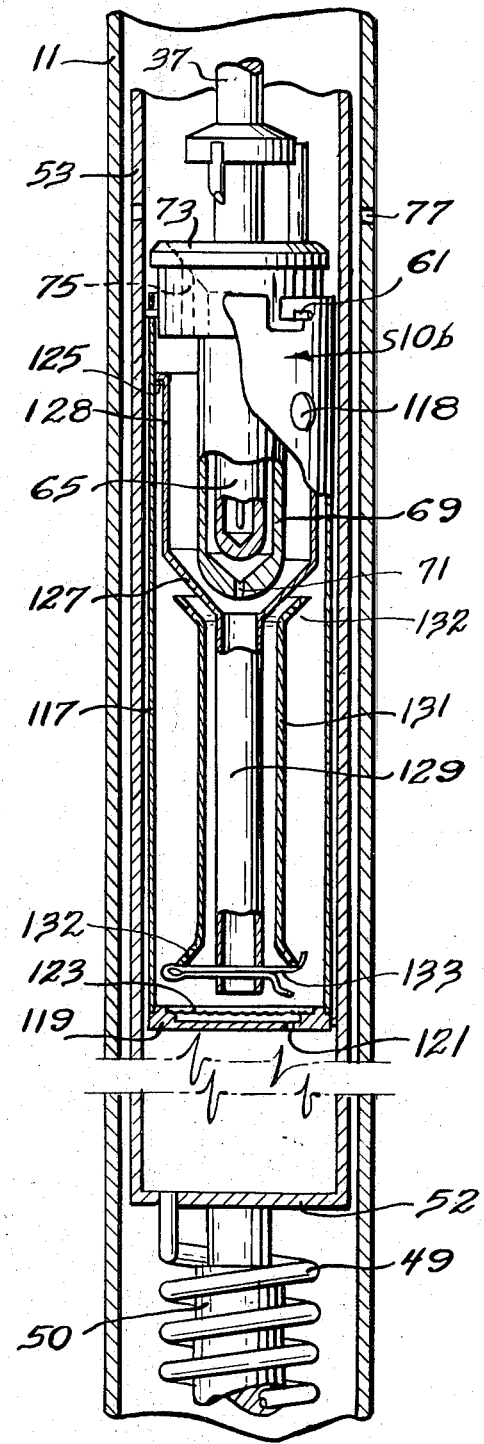

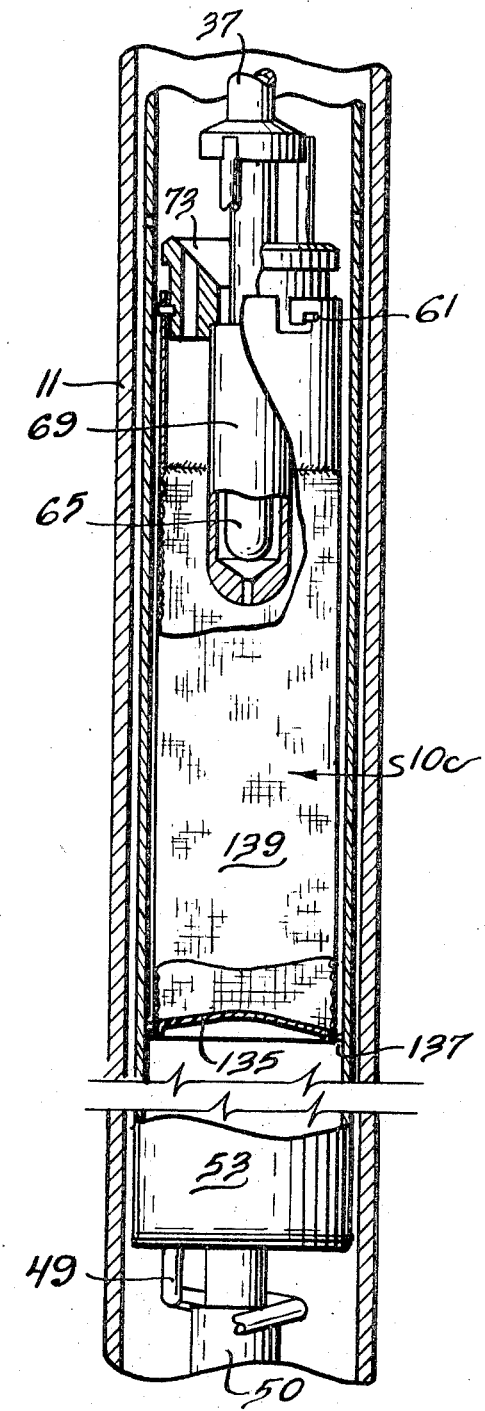

3,872,718

MULTIPURPOSE SAMPLER DEVICE FOR LIQUID METAL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to a liquid-metal sampling device that can be used to perform a number of sampling operations. It is particularly applicable for use with liquid-metal-cooled reactors such as those employing sodium or sodium-potassium alloys as coolant.

In operating liquid-metal systems such as a nuclear reactor, it is necessary to monitor the coolant, e.g. sodium, in a number of respects. Samples are taken for the analysis of impurities as well as to monitor the physical properties and heat-transfer characteristics of the fluid. Various impurities such as oxygen, hydrogen and carbon can greatly increase the corrosive capability of a liquid metal such as sodium.

In taking samples for analysis of impurities, it is desirable to flush the system and to allow the sample cup to overflow for a period of time in order to remove foreign substances that may remain from previous operations. Errors in sample analysis can also result from contamination of the sample by atmospheric contact. When the samples are to be immediately analyzed, this may not be a significant problem. However, often it is desirable to place the samples in an archive and analyze them at a later date. In some cases, the samples are stored and analyzed only if the system operation becomes aberrant. To provide accurate data after the samples have been stored for an extended period of time, it is required that they be maintained in an oxygen and moisture-free atmosphere.

Other sampling functions that arise in conjunction with the operation of a nuclear reactor and possibly other liquid-metal systems include equilibration of specimens for such as in-line oxygen analysis and collection of particulate material entrained in the liquid-metal flow. Cylindrical filters or strainers installed in vertical pipe sections have been satisfactory in collecting particulate material from the liquid sodium flow. In such applications as well as with an overflow sample cup, it is preferable that the flow of liquid metal be from top to bottom. On the other hand, when samples are held in equilibrium with the flow of liquid metal, it is important that no gas or vapor spaces contact the sample material. In order to do this, an upward flow through a vertical section of conduit is most often required.

To obtain accurate analyses through the equilibration of samples with the liquid-metal flow, it is often necessary to employ a controlled elevated temperature. When the liquid-metal flow is returned into the system, it must at that time be cooled to reasonably near the system temperature where it is to be returned. Temperature differences of more than 50°F. can cause thermal stress and shock which could damage the system piping and structures.

Prior art systems for sampling and analyzing liquid-metal flow have employed separate sampling devices for each function. The temperature and flow of each device are separately regulated to meet the particular sampling problem. In test and demonstration reactors within the USAEC's Liquid-Metal Fast-Breeder Reactor Program, large numbers of samples at different points of the process are required. Since the samples are radioactive and must be handled with remote operators within shielded facilities, the sampling procedures are made more difficult. Therefore, both the installation and the use of such sampling stations become expensive and awkward operations.

SUMMARY OF THE INVENTION

In view of the limitations of the prior art, it is therefore an object of the present invention to provide a sampling device capable of accommodating various sampling functions.

It is also an object to provide a sampling device for examining liquid metal at an elevated, controlled temperature and returning the sample flow to the system at a temperature near that at which it was withdrawn.

It is a further object to provide a liquid-metal sampling device for collecting sealed samples within an overflow cup, sampling particulate material from within a liquid-metal flow and equilibrating specimens with a liquid-metal flow.

In accordance with the present invention, a device for performing various sampling functions in respect to a flow of liquid metal is provided. The device is divided into an upper isothermal zone and a lower heating zone by separately controlled heating units surrounding a casing. A removable suspension member supports a detachable sample insert within the isothermal zone. The annulus between the sample insert and the casing is divided by a shroud tube to provide an outer passageway for entering liquid-metal flow to the top of the sample insert. The inner passageway between the shroud tube and the sample insert is sealed at the interface between the isothermal and heating zones. A helical coil of tubing communicates with this inner passageway and extends downwardly through the heating zone for the discharge of the liquid-metal flow. The entering liquid metal passes upwardly through the heating zone to effect heat transfer from the discharge stream. This not only economizes on energy input but also cools the discharged liquid-metal flow prior to its being reintroduced into the liquid-metal system.

The various inserts that can be employed with the sampling device include a cylindrical filter for trapping particulate matter, an archive cup for obtaining sealed samples of the liquid metal and a fixture for maintaining specimens in contact with the liquid-metal flow. Each of these inserts receives a flow of liquid metal into its upper end and discharges it at its lower portion. However, the equilibration insert also includes structure for providing passageways to the bottom of the insert and then upward flow in contact with the specimens.

DETAILED DESCRIPTION OF THE DRAWING

The present invention is illustrated in the accompanying drawings wherein:

FIG. 2 is an elevation view partly in cross-section of the isothermal zone of the FIG. 1 sampler with an archive-cup insert for obtaining a sealed sample.

FIG. 3 shows an equilibration insert installed within the isothermal zone of the FIG. 1 sampler device.

FIG. 4 shows a strainer insert within the isothermal zone of the FIG. 1 sampler device.

DETAILED DESCRIPTION OF THE PREFERRED EMBODIMENT

Figure 1:
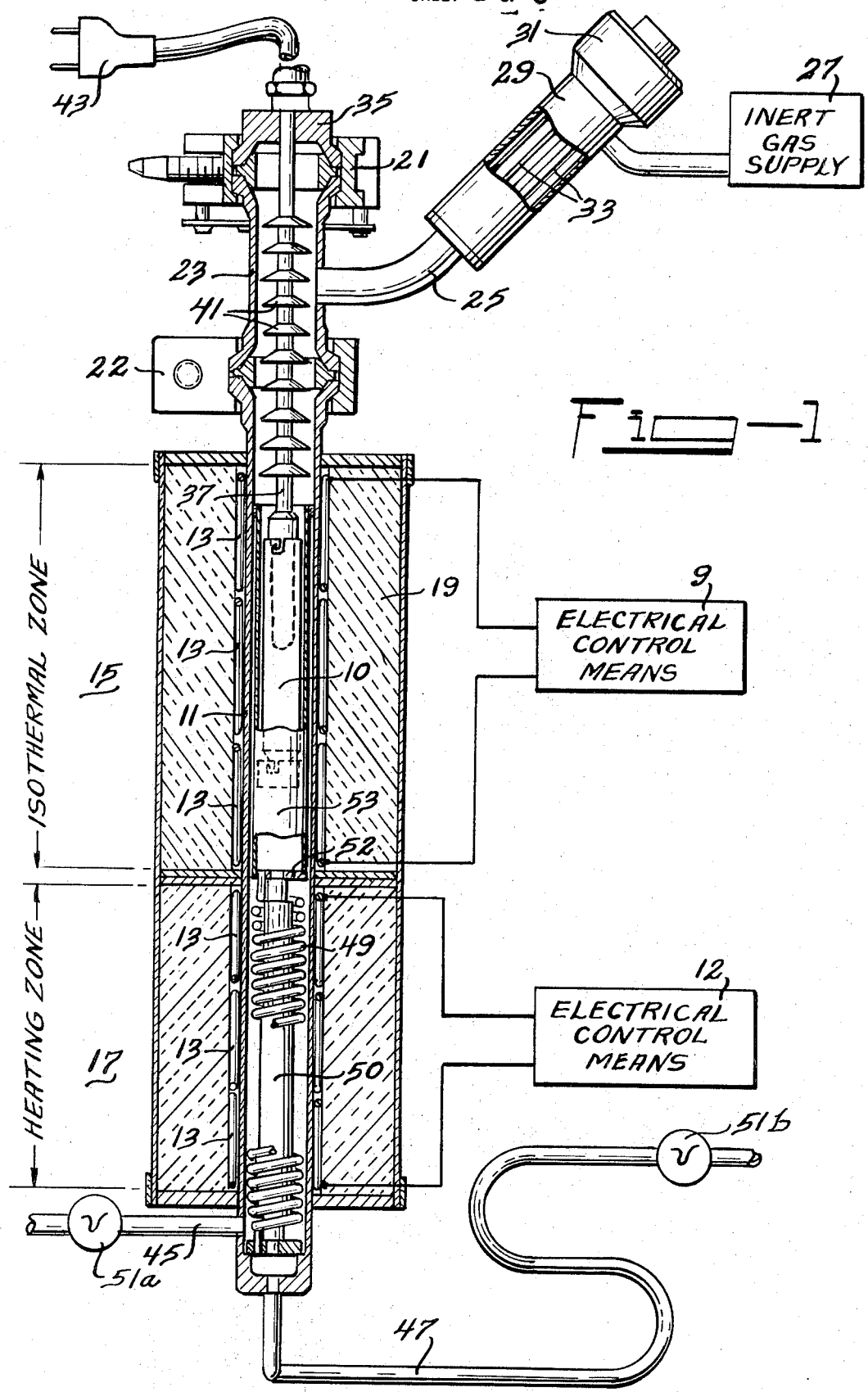
FIG. 1 is an elevation view in section of a multipurpose sampling device.

Referring now to FIG. 1, an assembled multipurpose sampler device containing a sampler insert 10 is shown. The device includes an elongated casing 11 of tubular shape encompassed by a number of electric heater elements 13. The upper and lower heater elements are separately controlled by electrical means 9 and 12 to establish an isothermal zone 15 and a heating zone 17 within the upper and lower portion respectively of the casing. Thermal insulation 19 surrounds the heating elements and may also be employed, as required, around the liquid-metal piping servicing the sampler.

Within the upper end of the casing beyond the heater elements 13 are two removable, clamp-type closures 21 and 22. The closures are commercially available pipe connectors that can be remotely or manually operated as required. The spool piece 23 between the two closures is adapted to receive an inert gas line 25 leading to an inert gas supply 27 for equalizing the pressure within the casing during changes in sample flow. The gas supply 27 is protected from an overflow of liquid metal by a freeze vent 29. Vent 29 comprises cooling fins 33 on the outer surface of gas line 25 and a blower 31 for passing cool air over the fins.

The upper end of closure 21 is formed as a hub 35 for closing casing 11 and for supporting an elongated suspension member 37. Suspension member 37 extends downwardly into the isothermal zone 15 where it suitably supports the sampler insert 10. The upper portion of suspension member 37 includes circular heat shields 41 for maintaining the closures and inert gas connections at an acceptably low temperature and to condense liquid metal vapors which would otherwise deposit within the freeze vent. Member 37 is of tubular construction to also serve as a conduit communicating with a thermowell for a temperature-measuring device disposed within its lower portion near or within insert 10. A connector 43 is illustrated at the upper end of the suspension member for electrically connecting the temperature-measuring device to a monitoring system (not shown).

The flow of liquid metal enters and leaves the multipurpose sampler through inlet tube 45 and outlet tube 47 connected into the lower portion of casing 11. The flow is controlled by valves 51a and 51b within these tubes. Outlet tube 47 is interconnected with a helical coil of tubing 49 formed around a column 50 within the heating zone 17. Helical coil 49 is formed with a gradual pitch preferably of less than two tube diameters in elevation per turn. Column 50 extends to the interface between the heating and isothermal zones where it supports a shroud tube 53 that extends upwardly into the isothermal zone coaxially around the sampler insert 10 but within casing 11. The bottom end of shroud tube 53 is closed with an end closure 52 which rests on column 50. End closure 52 is penetrated by the upper end of helical coil 49 for discharging liquid-metal flow from the sampler insert 10.

Referring now to FIG. 2, a more detailed description of the archive-cup insert and the surrounding portions of the multipurpose sampler are presented. The lower portion of suspension member 37 includes a closed thermowell 65 for protecting a temperature-measuring device illustrated as thermocouple 67. Thermowell 65 is coaxially enclosed within a sheath or immersion well 69 having an orifice 71 at its lowest point. It has been found that a one-sixteenth inch diameter orifice will sufficiently restrict flow at the typical rates given below for continuous immersion of thermowell 65. Immersion well 69 is surmounted with a flared bushing or funnel 73 which is attached to suspension member 37. Peripheral passageways 75 are formed vertically through the upper portions of funnel 73 to pass a major portion of the entering liquid-metal flow. The remaining minor portion of flow passes downwardly through immersion well 69 as it contacts thermowell 65 before being discharged through orifice 71 into the sampler insert. In order to direct liquid-metal flow into funnel 73, appropriate sized orifices 77 are located just above the funnel mouth within the upper portion of the shroud tube 53. The orifices are of sufficiently small size, for example, about one-eighth inch, such that a low head, e.g. less than 2 inches of liquid metal, will cause the flow to jet inwardly away from shroud tube 53 and into funnel 73.

Around the outer periphery of funnel 73 are horizontally projecting pins 61 which engage L-shaped slots 63 within the upper portion of the insert. The pins and slots form a bayonettype connection for removably suspending the insert within the isothermal zone of the multipurpose sampler device With this arrangement, thermowell 65 and immersion well 69 extend into the upper portion of the insert for temperature measurements near the sampling operation.

The archive-cup insert 10a is described in the assignee's copending Pat. application Ser. No. 411,127, entitled "Archive-Cup Insert for Liquid-Metal Sampling," filed on the filing date of the instant application. It comprises an outer tube 81 which includes slots 63 within its upper margins. The lower end of tube 81 is closed by an annular seal 83 that is removably attached by a bayonet or other suitable type of connection to permit insertion and removal of a sample cup 87. A second annular seal 85 is tightly positioned in a sealing relationship within the upper or central portion of tube 81 below the depth reached by immersion well 69. In between seals 83 and 85 is a space for the sample cup 87 which rests on a raised pedestal 89 at the center of annular seal 83. Cup 87 is centrally positioned by hemispherical indentations 91 within the periphery of outer tube 81.

Upper annular seal 85 includes an annular reservoir that is divided into an outer annulus 95 and an inner annulus 97 by the circumferential margins of a rounded dome 93. Circumferential passageways 101 at the edges of these margins permit subsurface flow of liquid metal between the inner and outer annuli. Within the center of annular seal 85 is a raised portion 99 including a vertical central opening 102 coaxially aligned with the opening into sample cup 87. A circular lip 100 at the bottom surface of seal 85 around the outlet provides a straight and coherent discharge flow into the insert for good agitation of the sample liquid. Raised portion 99 extends upwardly into dome 93 to an elevation slightly above the outer boundaries of annulus 95. This ensures that the seal is completely filled prior to overflow.

Lower annular seal 83 is of slightly different construction from that of seal 85. Seal 83 comprises an annular reservoir around pedestal 89 and can be made to overlap the lower extremity of tube 81. This arrangement as shown forms an inner annulus 103 and an outer annulus 105 interconnected by passageways 107 beneath tube 81. As shown, the lower seal 83 is suspended by a bayonet-type connection 109 and is spaced from the outer walls of tube 81 by arcuate tabs 111.

In operating the multipurpose sampler device assembled with an archive-cup insert, the system is first evacuated through the inert gas line 25. Subsequently, the sampler device is pressurized with inert gas, for instance nitrogen, to a pressure of a little less than that of the liquid-metal system to be sampled. After preheating the sampler device, liquid metal is then valved into the heating zone of the casing where it is heated to a slightly higher temperature to ensure effective wetting of the annular seal surfaces and a hermetic closure on solidification. The sample liquid then flows upwardly through the annulus between the shroud tube and casing across the isothermal zone until its level surpasses that of orifices 77. At this time it may be necessary to adjust the pressure of the inert gas to provide an adequate head, e.g. about 2 inches, above orifices 77 without overflowing the shroud tube or, more drastically, entering the inert gas system. The liquid metal jets inwardly through orifices 77 away from the shroud tube walls into funnel 73 where a major portion of the liquid flow gravitates through peripheral passageways 75 from the funnel, while a smaller portion passes downwardly through immersion well 69 and leaks out orifice 71. Orifice 71 is adequately sized to provide sufficient flow for temperature measurements while maintaining thermowell 65 immersed in liquid metal. It has been found that an orifice of about one-sixteenth inch diameter will sufficiently restrict flow at the rates given below to accomplish these requirements.

The recombined flow then passes through the outer annulus of upper seal 85 through passageways 101 beneath dome 93 and into the inner annulus 97 of the upper seal. The flow then overflows through the central opening 102 in raised portion 99 into the sample cup 87 which subsequently overflows into the lower seal 83. The flow through the lower seal passes downwardly through the inner annulus 103 of the reservoir and into the outer annulus 105 through passageways 111. The overflow from the outer annulus accumulates a sufficient level in the bottom of shroud tube 53 to overcome the pressure drop through helical coil 49.

At this point, the particular suitability of helical coil 49 is noted. Since it is of a continuous downward slope without reversals in vertical direction, inert gas trapped within the coil either at the beginning or subsequently during the operation of the sampler can be swept out by the flow of liquid metal. The flow passes downwardly into discharge tubing 47 which is of sufficiently large diameter to pass any entrained gas. Furthermore, the temperature of the liquid metal discharged through coil 49 is sufficiently lowered to avoid significant thermal stresses within the liquid-metal system on its return.

After passing sufficient flow to obtain a representative sample, valves 51a and 51b in the inlet and outlet tubes are closed. The multipurpose sampler is left undisturbed for a sufficient period of time for the liquid metal within the upper seal 85 and the lower seal 83 of the archive-cup insert to solidify. Closure 21 is then disassembled and the archive-cup insert withdrawn by means of suspension member 37. Of course, these handling operations are performed with remote operators in conjunction with a liquid-metal-cooled reactor or other radioactive facility.

Turning now to FIG. 3, a specimen equilibration insert 10b is shown, for containing and exposing specimens such as wires, foils or tabs to flowing liquid metal at appropriate temperatures. It comprises an outer tube 117 which is closed at its bottom end 119 except for a small aperture or drain hold 121. To prevent loss of specimen fragments, a screen 123 is located within a recessed surface above drain hole 121. The upper end of outer tube 117 is attached to suspension member 37 through use of a bayonet connection including pins 61. An internal ring or other support means 125 fixed within the upper portion of tube 117 supports an inner funnel 127. Funnel 127 includes an upper bowl portion which encompasses immersion well 69 and thermowell 65 and an axially extending discharge spout 129 of reduced diameter. Discharge spout 129 extends to near, e.g. about one-half inch, the closed end 119 of outer tube 117. Several suitably sized openings 118, for example, three of one-fourth inch O.D., are located through outer tube 17 just below ring 125 for overflow discharge of liquid metal.

Specimens to be held in equilibrium with the liquid-metal flow are supported on inner funnel 127 in the space between discharge spout 129 and outer tube 117. The specimens can be attached to the inner funnel in any suitable manner. As an example, a spool piece 131 is shown supported on a retainer pin 133 passing through the lower end portion of spout 129. Spool piece 131 includes flared end sections with peripheral openings 132 for attaching specimens in wire form. Specimen materials can include vanadium wire for equilibrating with a liquid metal such as sodium and thereby determining oxygen content. Other specimens that may be employed include iron alloys for determining carbon and scandium for determining hydrogen.

In operating the multipurpose sampler with the equilibration insert, the liquid-metal inlet and outlet flows are much the same as described above. However, in some instances, a substantial elevation in temperature may be required. For example, in the equilibration of vanadium with sodium metal, a temperature of 1382°F. is employed. The sodium metal entering the sampler from a liquid-metal-cooled reactor may be at a temperature within the range of 400° to 1200°F. Energy is provided to effect this temperature elevation by heater elements 13 and energy can be accumulated within the sampler through the economizing effect of helical coil 49. Through use of helical coil 49 as a heat exchanger, higher temperatures can be obtained than would otherwise result from a once-through flow near the heating elements 13. Moreover, coil 49 is provided with sufficient area to cool the discharged liquid metal to within a reasonably close temperature to that of the entering liquid metal. For example, a temperature difference at the inlet of about 50°F. can be readily obtained. Consequently, thermal stress or shock to the liquid metal piping or other structures within the facility, being monitored, can be minimized.

The heated liquid metal enters the equilibration insert through passageway 75 within funnel 73 as described above. It then flows into the inner funnel 127 of the insert and down discharge spout 129 into the volume of tube 117 around the specimens. The upward flow over the specimens minimizes the opportunity for gas collection within this region. The flow proceeds upwardly to openings 118 near the top of outer tube 117 and then downwardly through the annulus between shroud tube 53 and the insert. From the bottom of the shroud tube the flow passes into helical coil 49 as described above.

A typical run equilibrating sodium metal with vanadium wire will continue for about 4 hours. When the run is over, it is important to prevent further reaction of oxygen in the sodium metal with the wires. To do this the inlet liquid-metal flow is abruptly terminated and the liquid metal within volume 131 allowed to drain at the equilibrium temperature through hole 121 in the bottom of outer tube 117. With a one-sixteenth inch drain hole in a 1-½ inch O.D. tube of about 8 inch length, this has been found to occur in about 45 seconds. The equilibration insert 10b can then be allowed to cool for removal from the sampler as described above and the specimens analyzed for oxygen content by standard vacuum fusion techniques.

Results obtained using the multipurpose sampler with an equilibration insert containing vanadium wire for oxygen analysis of sodium metal are given in the table below. It can be seen that the results compare favorably with those obtained by a commercially available oxygen meter. The oxygen meter was previously calibrated by comparison with established, vanadium equilibrated techniques.

| Inlet Sodium Temp., °F. | Oxygen Concentration in Sodium, ppm | |
|---|---|---|
| | Multipurpose Sampler | By Oxygen Meter" |
| 450 | 0.49 | 0.50 |
| 450 | 0.51 | 0.56 |
| 850 | 0.47 | 0.50 |
| 850 | 0.57 | 0.53 |
| 1050 | 0.84 | 0.82 |
| 1050 | 1.0 | 1.1 |

"Oxygen meter readings were taken with a commercially available, electrochemical oxygen meter.

In FIG. 4, a filtration insert 10c is shown supported by suspension member 37 within the isothermal zone of the multipurpose sampler. Insert 10c is an elongated tube with a closed bottom 135 centered within shroud tube 53 by positioning buttons 137. The lower cylindrical portion or insert 10c is composed of a filter media 139 for removing particulate material from the liquid metal as it flows through the insert. Filter media 139 is selected to have a pore size suitable for the particular filtering operation to be performed. For use with a sodium-metal-cooled nuclear reactor, a nominal pore size of about 10 microns is preferred to remove very small entrained particles. One particularly suitable filter media for this purpose is a porous stainless steel matrix composed of a random array of stainless steel fibers compressed in a random fashion and sintered at high temperatures, thereby creating a porous metal.

In the employment of filtration insert 10c, it is supported from a bayonet connection by pins 61 in much the same manner as the other inserts. Liquid metal enters through funnel 73 of suspension member 37 and flows outwardly through filter media 139, trapping particulate material within the filtration insert. After the run is completed, the filtration insert is removed and the particulate material collected for analysis.

One example of a multipurpose sampler that has been built and successfully tested includes as a casing a length of 2 inch stainless steel Schedule 40 pipe closed at one end with a Schedule 160 pipe cap and at the other with two quick disconnect or remotely operable closures as shown. The heating zone is provided with a helical coil formed of about 10 feet of three-eighths inch O.D. 0.035 inch wall thickness tubing having about 23 coils formed on a one-half inch pitch. This gradual downward pitch and small diameter tube not only provide a large heat transfer area within a small volume, but also allow the flow of liquid metal to sweep out any gas or vapor entrained within the tube. A shroud tube of 1-⅞ inch O.D., 0.049 inch wall thickness and 13¾ inch long disposed above the helical coil is provided with three thirty-seconds inch diameter holes located 2-½ inch down from the top of the tube. Holes of one-eigth inch diameter were also found to be suitable for slightly greater flow rates but in either case at least 1-¼ inch of liquid metal head was required above the openings to jet the flow into funnel 73. A multipurpose sampler of these dimensions can be adequately heated with two axially split furnaces, each half having three heating elements capable of separate control. A total electrical heating capacity of about 3.6 kilowatts is adequate in this application.

In operating a multipurpose sampler of this particular size and design, a flow of sodium metal of between 0.15 gallon per minute and 0.30 gallon per minute is heated from a temperature as low as 400°F. to a temperature of nearly 1400°F. in the isothermal zone. The sodium flow leaving the sampler can be cooled to within 50°F. of the inlet sodium temperature, that is, to about 450°F., where 400°F. sodium is supplied to the sampler.

It can be seen that the present invention provides a multipurpose sampling device for performing various sampling functions. Various sampler inserts are illustrated, including an overflow cup for archive storage, a fixture for holding sample materials in equilibration with a flow of liquid metal and a filter medium for removing particulate material from the liquid-metal flow. Various other inserts or a combination of inserts might also be used depending on the particular sampling function to be performed. For instance, within a more elongated sampler than that illustrated, several archive cup inserts might be suspended in series or a filter medium might be disposed upstream of an archive cup insert. Various other arrangements and modifications limited only by the appended claims may also be used within the scope of the present invention.

The embodiments of the invention in which an exclusive property or privilege is claimed are defined as follows:

1. A multipurpose sampler device for use in the examination of liquid metals comprising an elongated, vertical casing having removable suspension means for supporting a detachable insert within the upper portion of said casing; heater means surrounding said casing for establishing an isothermal zone in the upper portion around said insert and a heating zone in the lower portion thereof; port means for passing entering liquid-metal flow through said heating and isothermal zones into the top of said insert; and a helical coil of tubing in flow communication with said insert for discharging liquid metal therefrom, said tubing extending through said heating zone in heat exchange contact with said flow of entering liquid metal.

2. The multipurpose sampler of claim 1 wherrein there is provided supply means for inert gas coupled to the upper portion of said casing and freeze vent means between said supply means and casing for excluding liquid metal.

3. The multipurpose sampler of claim 1 wherein there is provided in implementation of said port means a shroud tube coaxial within said casing throughout said isothermal zone, said shroud tube having a plurality of peripheral orifices above said sample insert but sufficiently below said shroud tube upper extremity and being of effective small size to cause liquid metal to jet away from the internal walls thereof into said sample insert.

4. The multipurpose sampler of claim 3 wherein said orifices are of about one-eighth inch diameter and are disposed about 2-½ inch below the upper extremity of said shroud tube.

5. The multipurpose sampler of claim 1 wherein said suspension means comprises a conduit having a closed well at the lower end thereof disposed in the upper portion of said insert, said well containing monitoring means for measuring the temperature of said liquid-metal flow.

6. The multipurpose sampler of claim 1 wherein said helical coil of tubing is formed with a gradual downward pitch of less than two tube diameters per turn.

7. The multipurpose sampler of claim 1 wherein an insert for filtering particulate material from said liquid metal is detachably supported from said suspension means, said filtration insert comprising an elongated tube having a cylindrical portion of porous filter medium and a closure at the lower end thereof.

8. The multipurpose sampler of claim 1 wherein an insert for holding specimens to be equilibrated with said liquid-metal flow is detachably supported from said suspension means, said equilibration insert comprising support means for holding said specimens within said insert; and drain means for withdrawing said liquid metal from contact with said specimens at essentially constant temperature after equilibration is achieved.

9. The multipurpose sampler of claim 8 wherein there is provided funnel and spout means for receiving downward liquid-metal flow and upwardly directing said flow into contact with said support means for holding said specimens.

10. The multipurpose sampler of claim 8 wherein said equilibration insert comprises an outer tube having an end closure with a drain aperture therein; a funnel coaxial within said outer tube, and having an upper bowl with interconnected spout extending downwardly to near said end closure; and support means held by said funnel with vanadium wire attached thereto for equilibration with said liquid-metal flow to determine the oxygen content of said flow.

* * * * *